(12) United States Patent
Kopton (10) Patent No.: US 10,596,647 B2
(45) Date of Patent: Mar. 24, 2020

(54) METHOD FOR PRODUCING A THREADED HOLE

(71) Applicant: AUDI AG, Ingolstadt (DE)

(72) Inventor: Peter Kopton, Kösching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/304,384

(22) PCT Filed: Jun. 27, 2017

(86) PCT No.: PCT/EP2017/000753
§ 371 (c)(1),
(2) Date: Nov. 26, 2018

(87) PCT Pub. No.: WO2018/010831
PCT Pub. Date: Jan. 18, 2018

(65) Prior Publication Data
US 2019/0291195 A1 Sep. 26, 2019

(30) Foreign Application Priority Data
Jul. 13, 2016 (DE) .................. 10 2016 008 477

(51) Int. Cl.
*B23G 5/20* (2006.01)
*B23G 1/16* (2006.01)
(Continued)

(52) U.S. Cl.
CPC ............ *B23G 1/16* (2013.01); *B23D 13/00* (2013.01); *B23G 5/06* (2013.01); *B23G 5/20* (2013.01)

(58) Field of Classification Search
CPC .......... B23G 5/184; B23G 5/188; B23G 5/20; B23G 5/14; B23G 2200/143;
(Continued)

(56) References Cited

U.S. PATENT DOCUMENTS 194,469 A 8/1877 Schaub
3,346,894 A * 10/1967 Lemelson ............... B23B 51/08
408/12
(Continued)

FOREIGN PATENT DOCUMENTS

CN 1159777 A 9/1997
CN 104582895 A 4/2015
(Continued)

OTHER PUBLICATIONS

Japanese Office Action dated Oct. 23, 2019, in corresponding Japanese Application No. 2019-501971 (8 pgs., including machine-generated English translation).
(Continued)

*Primary Examiner* — Eric A. Gates
*Assistant Examiner* — Chwen-Wei Su
(74) *Attorney, Agent, or Firm* — Maier & Maier, PLLC (57) ABSTRACT

A method for producing a threaded hole in a workpiece with a thread tapping tool bit, which, at its drill bit tip, has a main cutting edge and a thread profile that trails in a thread tapping direction with at least one thread cutting tooth, wherein, in a thread tapping stroke, the main cutting edge produces a core hole, and, at the same time, the thread profile forms an internal thread at the inner wall of the core hole until a target thread depth is reached, and this is conducted with a thread tapping advance in the thread tapping direction and at a thread tapping rotational speed of the thread tapping tool bit synchronized therewith. After the thread tapping stroke, an oppositely directed reversing stroke is produced, in which the thread tapping tool bit is withdrawn out from the threaded hole in a reversing direction and, in fact, this is conducted with an opposite reversing feed.

14 Claims, 10 Drawing Sheets

(51) Int. Cl.
   *B23G 5/06* (2006.01)
   *B23D 13/00* (2006.01)
(58) Field of Classification Search
   CPC .......... B23G 2200/14; B23G 2200/148; B23G 2200/18; B23G 1/16; B23G 5/06; B23D 13/00; Y10T 409/509676; Y10T 409/502624; Y10T 409/502788; Y10T 409/503116
   See application file for complete search history.

(56) References Cited

U.S. PATENT DOCUMENTS

| | | | |
|---|---|---|---|
| 3,694,838 | A | 10/1972 | Runton |
| 5,413,438 | A | 5/1995 | Turchan |
| 5,678,962 | A | 10/1997 | Hyatt et al. |
| 5,733,078 | A | 3/1998 | Matsushita et al. |
| 7,097,395 | B2 * | 8/2006 | Horiuchi .................. B23B 51/08 408/1 R |
| 9,662,728 | B2 | 5/2017 | Glimpel et al. |

FOREIGN PATENT DOCUMENTS

| | | |
|---|---|---|
| CN | 205673714 U | 11/2016 |
| DE | 1818609 U | 9/1960 |
| DE | 38 80 394 T2 | 7/1993 |
| DE | 39 39 795 C2 | 9/1993 |
| DE | 102005022503 A | 3/2006 |
| DE | 10 2009 038 173 A1 | 3/2011 |
| DE | 10 2012 110 986 A1 | 5/2013 |
| DE | 10 2014 112 162 A1 | 3/2016 |
| JP | 2006-082199 A | 3/2006 |
| JP | 2015-523915 A | 8/2015 |

OTHER PUBLICATIONS

European Office Action dated Sep. 25, 2019, in connection with EP Application No. 17736877.6 (11 pgs., including machine-generated English translation).

International Preliminary Report on Patentability dated Jan. 24, 2019 in corresponding International Application No. PCT/EP2017/000753; 7 pages.

Examination Report dated Aug. 23, 2017 of corresponding German application No. 10 2016 008 477.4; 9 pages.

International Search Report and Written Opinion of the International Search Authority dated Oct. 5, 2017 in corresponding International application No. PCT/EP2017/000753; 7 pages including partial English-language Translation Attached.

International Preliminary Report on Patentability dated Oct. 10, 2018 in corresponding International application No. PCT/EP2017/000753; 21 pages.

Written Opinion under Rule 66 PCT dated Jun. 19, 2018 in corresponding International application No. PCT/EP2017/000753; 18 pages.

* cited by examiner

METHOD FOR PRODUCING A THREADED HOLE

FIELD

The invention relates to a method for producing a threaded hole, in particular a threaded blind hole, as well as a thread tapping tool bit for carrying out such a method.

Usually, during thread tapping, in a first process step, a core hole is produced in the workpiece by means of a drill bit. Subsequently, in a second process step, an internal thread is cut in the core hole by means of a separate tapping bit. Depending on its size, the tapping bit has two or more cutting edges. The cutting edges have teeth, each of which removes a chip of material from the inner wall of the core hole, and, if need be, plastically deforms the material to a small extent. The teeth of the tapping bit are designed differently; for example, they are flattened to different extents. In this way, during cutting, each tooth entrains chips of material of roughly the same size.

In departure from the above thread tapping process, the generic method occurs using a percussion thread tapping tool bit, for which the drilling of the core hole and the cutting of the internal thread are carried out in a common tool bit stroke. At its drill bit tip, the percussion thread tapping tool bit has a main cutting edge and a thread profile that trails in a thread tapping direction and with least one thread cutting tooth. In the method, a thread tapping stroke and subsequently an oppositely directed reversing stroke occur. In the thread tapping stroke, on the one hand, the main cutting edge produces the core hole and, on the other hand, the thread profile produces the internal thread at the inner wall of the core hole until a useable target thread depth is reached. The thread tapping stroke is carried out with a thread tapping advance feed at a rotational speed of the thread tapping tool bit that is synchronized with it. In an oppositely directed reversing stroke that follows, the thread tapping tool bit is withdrawn out of the threaded hole in a reversing direction, and, namely, is done so with an opposite reversing feed and at a reversing rotational speed synchronized with it. In this way, it is ensured that the thread profile of the thread tapping tool bit is moved in the thread turn of the internal thread in a load-free manner.

In the above method, the thread tapping process is slowed down at the end of the thread tapping stroke; that is, the thread tapping advance feed, together with the thread tapping rotational speed synchronized with it, is reduced to zero. However, in the prior art, this slowing down of the thread cutting process to a thread tapping rotational speed of zero leads to an excessively large cutting load on the thread profile, which can lead to cutting teeth being broken off or the tool bit being broken.

Known from DE 38 80 394 T2 is a combined tool bit for drilling a hole and for thread cutting. The thread tapping tool bit is used, first of all, to produce a core hole. Subsequently, the thread tapping tool bit is moved with its tool bit axis in a circular path around the hole axis, and, namely, is done so with rotation of the thread tapping tool bit, as a result of which the thread profile produces an internal thread in the core hole. Essentially the same method is known from DE 39 39 795 T2 and from U.S. Pat. No. 5,678,962.

SUMMARY

The object of the invention includes providing a method for producing a threaded hole in a workpiece as well as a thread tapping tool bit for carrying out the method, in which the load on the tool bit is reduced.

In accordance with the above, the thread profile has at least one broaching cutting edge, with which the following process control is made possible: Thus, when the reversing stroke is carried out by means of the broaching cutting edge, a broached groove is produced in the threaded hole, by way of which the thread cutting tooth is withdrawn out of the threaded hole in a load-free manner. The broached groove crosses the thread turn of the internal thread, with the radially outer groove bottom of the broached groove lying radially outside of a radially outer thread root of the internal thread. When the reversing stroke is carried out, the rotational speed of the thread tapping tool bit is preferably 0. Alternatively to this, the thread tapping tool bit can also be driven at a reversing rotational speed.

In order to reduce the mechanical load on the thread tapping tool bit, it is preferred when, after the thread tapping stroke, the reversing stroke does not directly follow, but rather, first of all, a groove-forming step follows. In the groove-forming step, a peripheral groove that adjoins the internal thread and does not have a thread pitch is formed. In the peripheral groove, the thread profile of the thread tapping tool bit can rotate in a load-free manner. In this way, the thread tapping rotational speed can be reduced to 0, without an excessively large cutting load leading to the tool bit being broken or to a breaking free of the thread profile.

As mentioned above, the thread profile of the thread tapping tool bit can rotate in a load-free manner in the peripheral groove without thread pitch, which is produced in the groove-forming step. The provision of the peripheral groove makes it possible, moreover, for the thread tapping tool bit to use a cutting edge to produce a peripheral thread countersink in the opening of the hole. The peripheral thread countersink can therefore also be produced during the above groove-forming step.

In a first embodiment, the thread tapping tool bit can be utilized as a pre-processing tool bit. In this case, the pre-processed threaded hole needs to be post-processed in a post-processing step with the aid of a finishing tool bit. As a finishing tool bit, it is possible to utilize a thread former, a helical thread former, or an axial thread former.

Alternatively to this, in a second embodiment, the thread tapping tool bit itself can be formed as a finishing tool bit. In this case, the above-mentioned additional post-processing step can be dispensed with.

In a technical implementation, the thread tapping stroke can be prolonged in the thread tapping direction directly with a groove-forming stroke. In this case, the thread tapping tool bit is moved beyond the target thread depth until a target hole depth is reached and, in fact, is done so with a groove-forming advance as well as at a groove-forming rotational speed that are not synchronized with each other and/or are different from the thread tapping advance and from the thread tapping rotational speed.

It is preferred when, at the end of the groove-forming step, the thread profile can rotate completely in the peripheral groove of the threaded hole in a load-free manner. The peripheral groove is produced during the groove-forming stroke by means of the main cutting edge as well as by means of the thread cutting tooth (or general thread tooth) of the thread profile at the thread tapping tool bit.

When the target hole depth is reached, the groove-forming advance is reduced to 0. At the same time, the groove-forming rotational speed is also reduced to 0 in order to make possible the reversing stroke in accordance with the invention.

At the start of the reversing stroke, the thread tapping tool bit is controlled so that the thread cutting tooth can be driven in a load-free manner into the broached groove outlet, which opens into the peripheral groove. Subsequently, the thread tapping tool bit is withdrawn out of the threaded hole in a direction that is opposite to the thread tapping direction and, in fact, is done so with a reversing feed as well as, if need be, at a reversing rotational speed, as a result of which the thread cutting tooth can be withdrawn out of the threaded hole without removal of material.

While the thread tapping stroke, the groove-forming stroke, and the reversing stroke are being carried out, the longitudinal axis of the core hole and the rotational axis of the thread tapping tool bit preferably remain aligned at all times coaxially to each other.

A thread tapping tool bit for carrying out such a method can preferably have a clamping shaft and a thread tapping body adjoined thereto. Along the longitudinal axis thereof, at least one chip groove can extend to a front-end main cutting edge at the drill bit tip. At the front-end main cutting edge, a chip surface delimiting the chip groove and a front-end free surface of the drill bit tip converge. As viewed in the peripheral direction of the tool bit, the chip groove can be delimited by at least one drill bit web. The chip surface of the chip groove can transition, with formation of an auxiliary cutting edge, into a back surface of the drill bit web on the outer peripheral side. At the back surface of the drill bit web on the outer peripheral side, the thread profile can be formed with at least one thread cutting tooth and an associated broaching cutting edge. The tooth height of the thread cutting tooth is dimensioned in the radial direction in such a way that the thread cutting tooth protrudes outward over the main cutting edge by a radial offset in the radial direction. If need be, the thread cutting tooth can extend the main cutting edge in a flush manner outward in the radial direction. Alternatively and/or additionally, as viewed in the axial direction, the thread cutting tooth can be arranged at an axial offset behind the main cutting edge. In addition, the thread profile has the at least one broaching cutting edge.

The thread profile-cutting tooth is shaped with a radially outer profile-base cutting edge, which protrudes radially outward over the main cutting edge by a cutting tooth height. Accordingly, the thread-profile broaching cutting edge also has a radially outer groove-bottom cutting edge, which projects radially outward over the main cutting edge by a broaching cutting edge height. The radially outer groove-bottom cutting edge of the thread-profile broaching cutting edge transitions into the drill bit web at lateral groove-flank cutting edges. The groove-bottom cutting edge of the broaching cutting edge and the profile-base cutting edge of the thread-profile cutting tooth in this case are aligned roughly at a right angle to each other.

In a preferred embodiment variant, the thread tapping tool bit can have four drill bit webs. Each of these drill bit webs is formed at least with one thread cutting tooth, and these teeth are formed peripherally distributed on the drill bit. The thread cutting teeth are preferably formed with cutting geometries that are not identical, but are rather different in design. By way of example, in the peripheral direction of the drill bit, a preliminary cutting tooth, two middle cutting teeth, and a finishing tooth of different cutting geometry are formed in succession on the drill bit. The cutting teeth are formed on the thread tapping tool bit in an offset manner with respect to each other in the axial direction. The extents of offset thereof are matched to the thread tapping rotational speed and to the thread tapping advance in such a way that a flawless thread cutting is ensured.

In the above embodiment variant, each of the total of four peripherally distributed thread cutting teeth is associated with at least one broaching cutting edge. The broaching cutting edges do not need to have identical cutting geometry. Instead, the cutting geometry of the respective broaching cutting edge is governed in each case by the cutting geometry of the thread cutting tooth in front in the axial direction. For differently dimensioned thread cutting teeth, therefore, the broaching cutting edges can have different cutting geometries. Accordingly, the broached grooves produced in the internal thread also do not need to be identical, but rather they can be differently dimensioned.

The advantageous embodiments and/or enhancements of the invention explained above and/or presented in the dependent claims—apart from cases of clear dependencies or incompatible alternatives, for example—can be implemented individually or also in any combination with one another.

BRIEF DESCRIPTION OF THE DRAWINGS

The invention and its advantageous embodiments and enhancements as well as the advantages thereof are explained in detail below on the basis of drawings.

Shown are:

FIG. 8 is a view of an exemplary embodiment corresponding to FIG. 1a; and

FIG. 9 is a view of another exemplary embodiment corresponding to FIG. 1a.

DETAILED DESCRIPTION

Figure 1A:
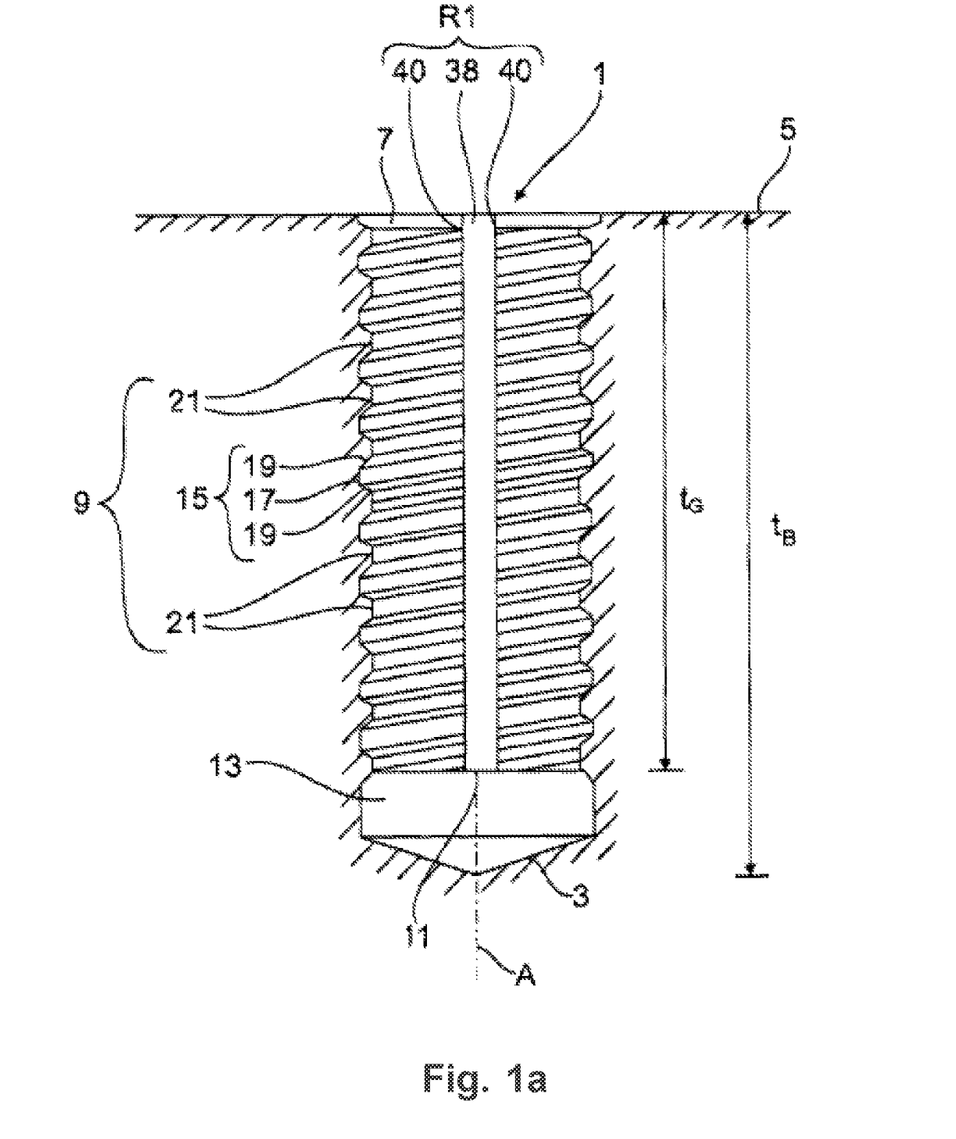
FIG. 1a in an illustration in lateral section, a threaded blind hole formed in a workpiece.
Figure 1B:
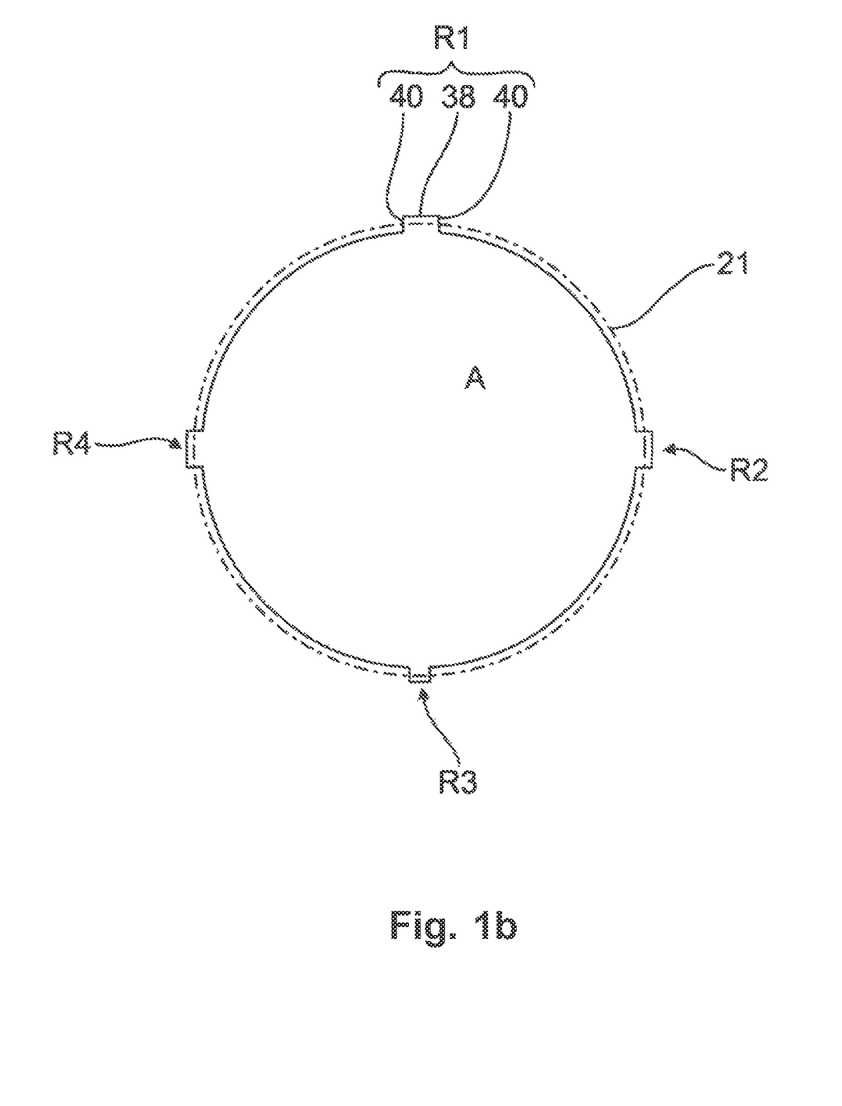
FIG. 1b a view from the top onto the threaded blind hole.

Shown in FIGS. 1a and 1b is a finished threaded blind hole 1. The hole 1, which has a hole bottom 3, is worked to a target drilling depth $t_B$ in a workpiece 5 by means of a so-called percussion drill processing, which will be explained later on the basis of FIGS. 5 to 8. At its hole opening, the hole 1 has a peripheral thread countersink 7, which, in the further course, transitions downward into an internal thread 9. The internal thread 9 extends along the hole axis A to a useable target thread depth $t_G$. As further ensues from FIG. 1, a thread turn 15 of the internal thread 9 opens into a peripheral groove 13. Said groove does not have a thread pitch and, as viewed in the axial direction, is formed between the internal thread 9 and the hole bottom 3. The thread turn 15 has a radially outer thread root 17 as well as lateral thread flanks 19, which transition radially inward into a thread inner crown 21.

In addition, the threaded blind hole 1 has a total of four broached grooves R1 to R4, which are distributed uniformly in the peripheral direction and open with a broached groove outlet 11 (FIG. 1a) into the peripheral groove 13 and, in the axial direction, cross through the thread turn 15 of the internal thread 9. In FIG. 1b, the radially outer groove bottom 38 of the respective broached groove R1 to R4 is arranged radially outside the radially outer thread root 17 of the internal thread 9. The broached grooves R1 to R4 are formed during the later-described production of the internal thread 9 by use of the broaching cutting edges 41, 42, 43, 44 of the thread tapping tool bit 23, that is, when a reversing stroke R is carried out.

Figure 2:
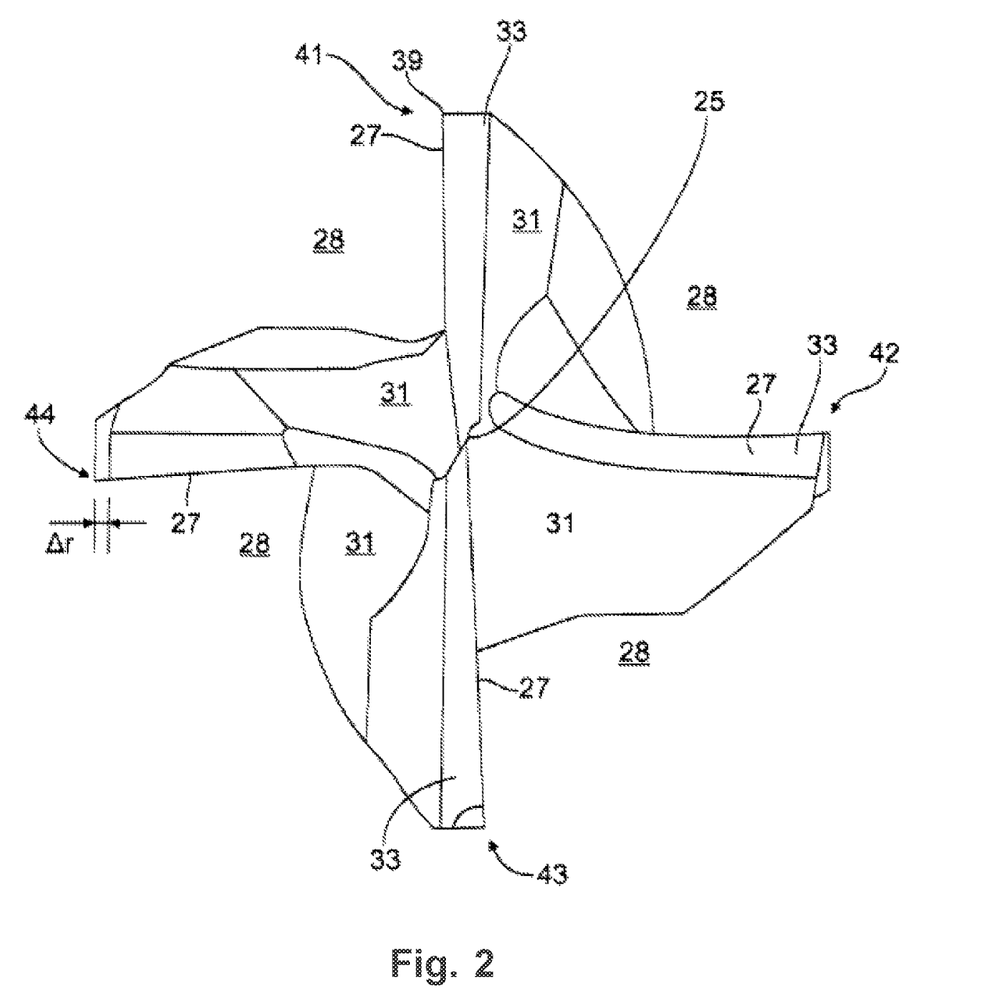
FIG. 2 in a view from in front, a thread tapping tool bit.
Figure 3:
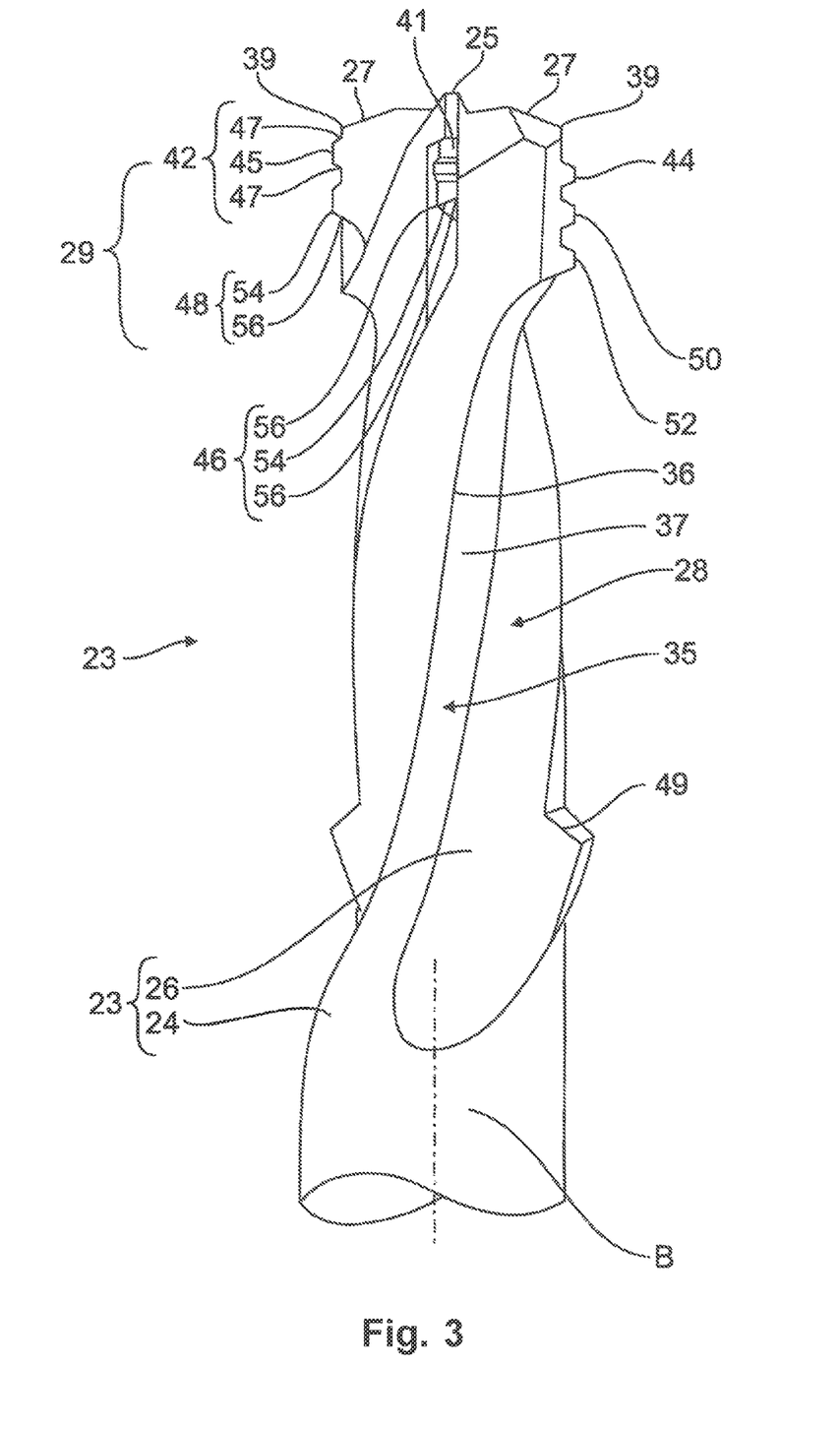
FIG. 3 a lateral view of the thread tapping tool bit.

The threaded blind hole 1 shown in FIGS. 1a and 1b is made by use of the thread tapping tool bit 23 described below on the basis of FIGS. 2 and 3. In accordance therewith, at its drill bit tip 25, the tool bit 23 in FIG. 2 has four uniformly peripherally distributed, front-end main cutting edges 27 as well as a thread profile 29 trailing in the thread tapping direction I (FIG. 3.)

The tool bit 23 is constructed with a clamping shaft 24 as well as with an adjoining thread tapping body 26, along the hole axis A for which a total of four chip grooves 28, which are distributed on the peripheral side, extend to the respective front-end main cutting edge 27 at the drill bit tip 25.

At each main cutting edge 27, a chip surface 31 delimiting the chip groove 28 and a front-end free surface 33 of the drill bit tip 25 converge. In the tool bit peripheral direction, the respective chip groove 28 is delimited by a drill bit web 35. Overall, the thread tapping tool bit 23 shown in FIGS. 2 and 3 has four drill bit webs 35. In this case, the chip surface 31 of the chip groove 28 transitions, with the formation of an auxiliary cutting edge 36, into a back surface 37 of the respective drill bit web 35 on the outer peripheral side. The auxiliary cutting edge 36 and the front-end main cutting edge 27 converge at a radially outer main cutting edge 39.

Figure 4:
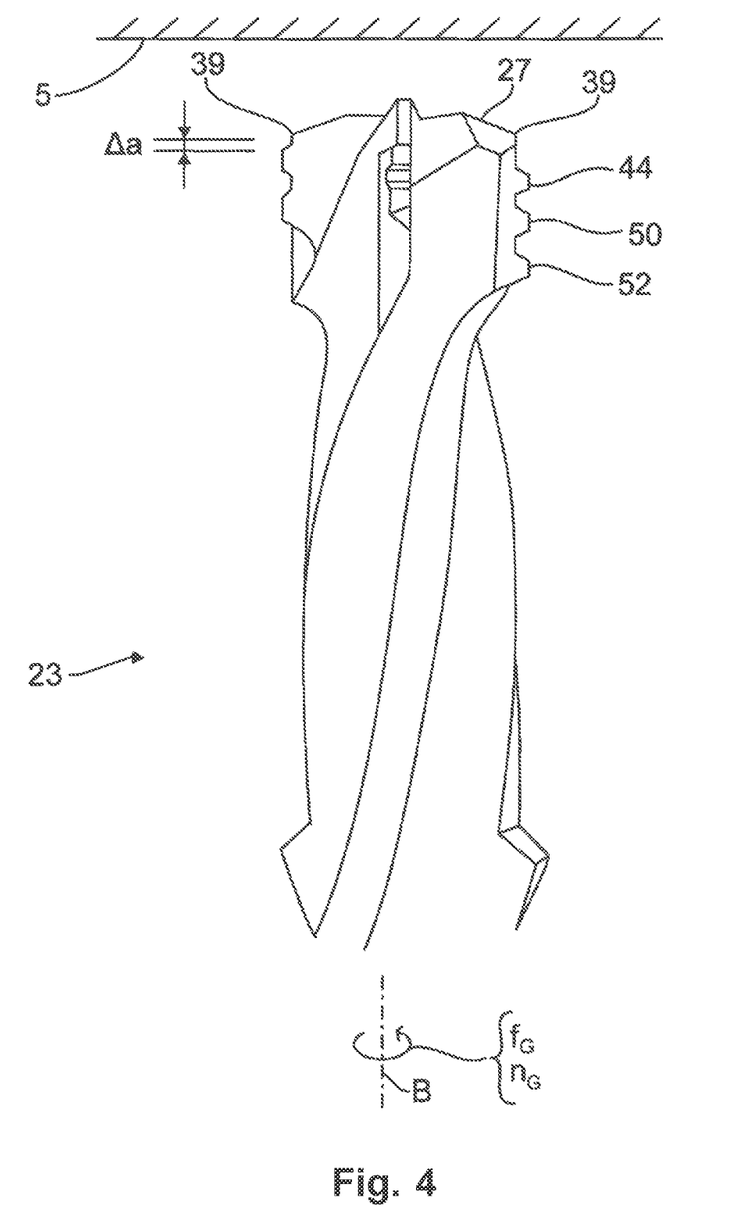
FIG. 4 illustrates a view that illustrate the method steps for producing the threaded blind hole shown in FIG. 1.
Figure 5:
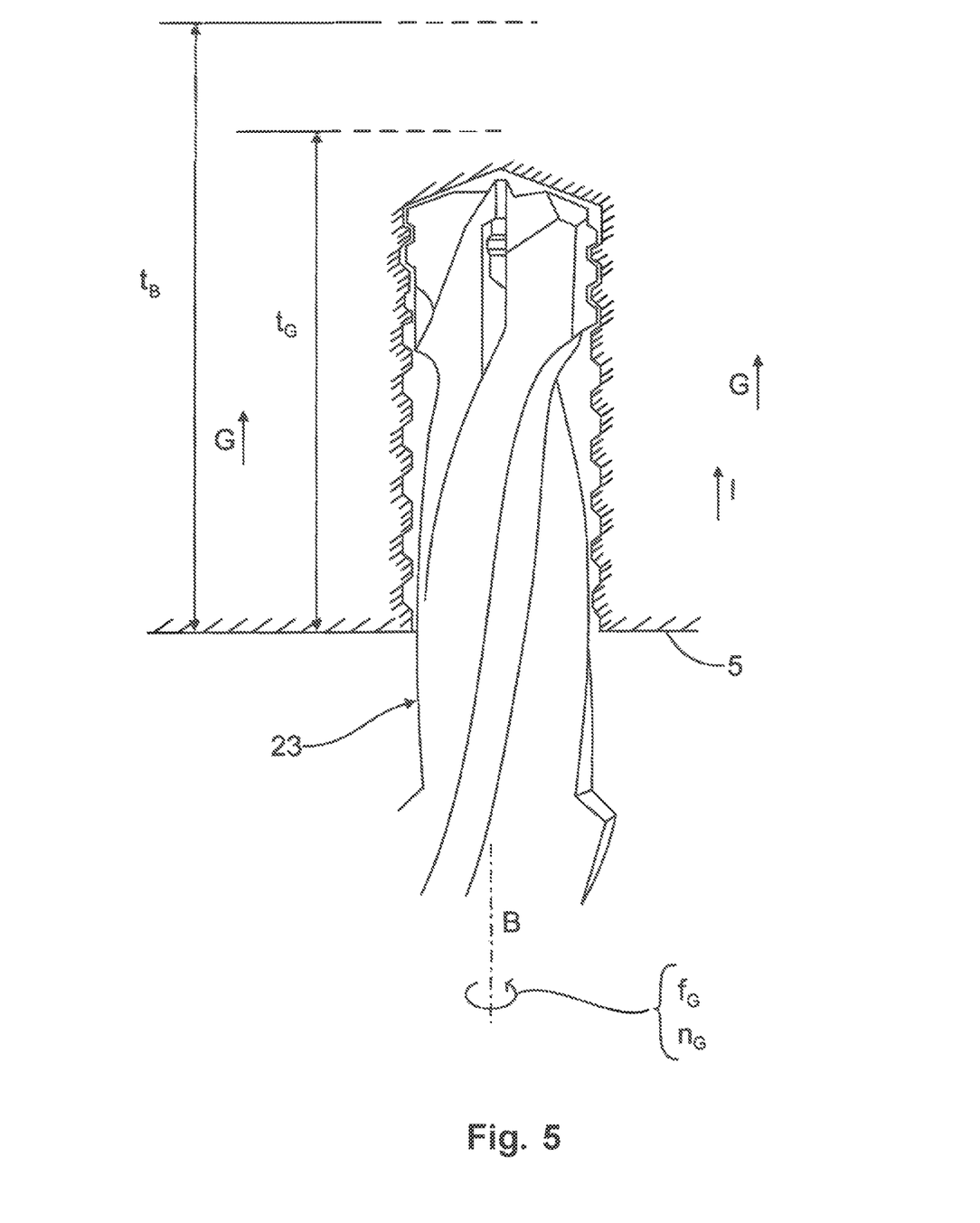
FIG. 5 illustrates another view that illustrate the method steps for producing the threaded blind hole shown in FIG. 1.

At the back surfaces 37 of the four drill bit webs 35 on the outer peripheral side, the thread profile 29 has, in each case, a preliminary cutting tooth 41, first and second middle cutting teeth 42, 43, and a finishing cutting tooth 44. In FIG. 3, each of the cutting teeth 41, 42, 43, 44 is formed with a radially outer thread-root cutting edge 45 as well as with thread-flank cutting edges 47 in order to cut/to shape the thread turn 15 shown on the basis of FIG. 1a. In this case, the cutting teeth 41 to 44 are designed in different geometries and are spaced at different axial distances Δa (only indicated in FIG. 4) from the drill bit tip 25 in order to cut the thread turn 15 of the internal thread 9 shown in FIG. 1. By way of example, the preliminary cutting, middle cutting, and finishing cutting teeth 41, 42, 43, 44 have different axial dimensions in the axial direction and/or different cutting tooth heights Δr (FIG. 2) in the radial direction. By way of example, the preliminary cutting, middle cutting, and finishing cutting teeth 41, 42, 43, 44 become axially larger in the peripheral direction. The finishing cutting tooth 44 then cuts the entire internal thread contour. Alternatively to this, the finishing cutting tooth 44 can also be designed as a shaping tooth in order to increase the thread strength without further chip processing.

In addition, at the transition between the thread tapping body 26 and the clamping shaft 24, the thread tapping tool bit 23 has a cutting edge 49 for formation of the thread countersink 7 shown in FIG. 1.

In the figures, the four peripherally distributed thread cutting teeth 41, 42, 43, 44 are each associated with at least one broaching cutting edge 46, 48, 50, 52. The cutting geometry of the broaching cutting edges 46, 48, 50, 52 is governed in each case by the cutting geometry of the thread cutting teeth 41, 42, 43, 44 in front in the axial direction. This means that, for the differently dimensioned thread cutting teeth 41, 42, 43, 44, the broaching cutting edges 46, 48, 50, 52 also have different cutting geometries. Additionally associated with the thread cutting tooth 44 shown in FIG. 4 on the right is not only one broaching cutting edge, but a total of two broaching cutting edges 50, 52, which are arranged in succession in the axial direction. In this way, the load placed on the tool bit is reduced during the removal of material occurring in the reversing stroke H. On account of the different cutting geometries of the broaching cutting edges 46, 48, 50, 52, the broached grooves R1 to R4 in the internal thread 9 shown in FIG. 1b are differently dimensioned.

As ensues from FIG. 3, each of the thread-profile broaching cutting edges R1 to R4 has a radially outer groove-bottom cutting edge 54, which protrudes radially outward over the main cutting edge 39 by a broaching cutting edge height. The groove-bottom cutting edge 54 transitions into lateral groove-flank cutting edges 56. The groove-bottom cutting edge 54 extends in the peripheral direction of the drill bit and is aligned at a right angle to the profile-base cutting edge 45 of the respective thread-profile cutting teeth 41, 42, 43, 44. The profile-base cutting edge 45 extends along the longitudinal axis B of the drill bit.

As viewed in the longitudinal axis B of the drill, the outer contour of the thread-profile broaching cutting edge 46, 48, 50, 52 completely covers the outer contour of the respective thread-profile cutting teeth 41, 42, 43, 44, so that, during the reversing stroke H, the thread-profile cutting teeth are withdrawn out of the threaded hole through the broached grooves R1 to R4 in a load-free manner.

Described below on the basis of FIGS. 5 to 8 is the method for producing the threaded blind hole 1 shown in FIG. 1: In accordance therewith, in FIG. 1, the thread tapping tool bit 23 is guided in a thread tapping direction I on the not yet predrilled workpiece 5 and a percussion drilling is carried out. The percussion drilling is divided into a thread tapping stroke G, a groove-forming stroke N, and a reversing stroke R. In the thread tapping stroke G, the main cutting edges 27 produce a core hole, and, at the same time, the trailing thread profile 29 produces the internal thread 9 at the inner wall of the core hole. The thread tapping stroke G occurs with a thread tapping advance fG and at a thread tapping rotational speed nG synchronized therewith in a thread tapping rotational direction and, in fact, proceeds until the target thread depth tG is reached. The broaching cutting edges 46, 48, 50, 52 are dimensioned in such a way that, in the thread tapping stroke G, they can be guided in a largely load-free manner by way of the thread turn 15 that is formed by means of the thread cutting teeth 41, 42, 43, 44.

Immediately afterwards, a groove-forming step (FIG. 7) is carried out, in which the threaded hole stroke G is prolonged in the thread tapping direction I by a groove-forming stroke N. In the groove-forming stroke N, in contrast to the thread-forming stroke G, the groove-forming advance fN and the groove-forming rotational speed nN of the thread tapping tool bit 23 are not synchronized with each other and are different from the preceding thread tapping advance fG and from the thread tapping rotational speed nG.

Figure 6:
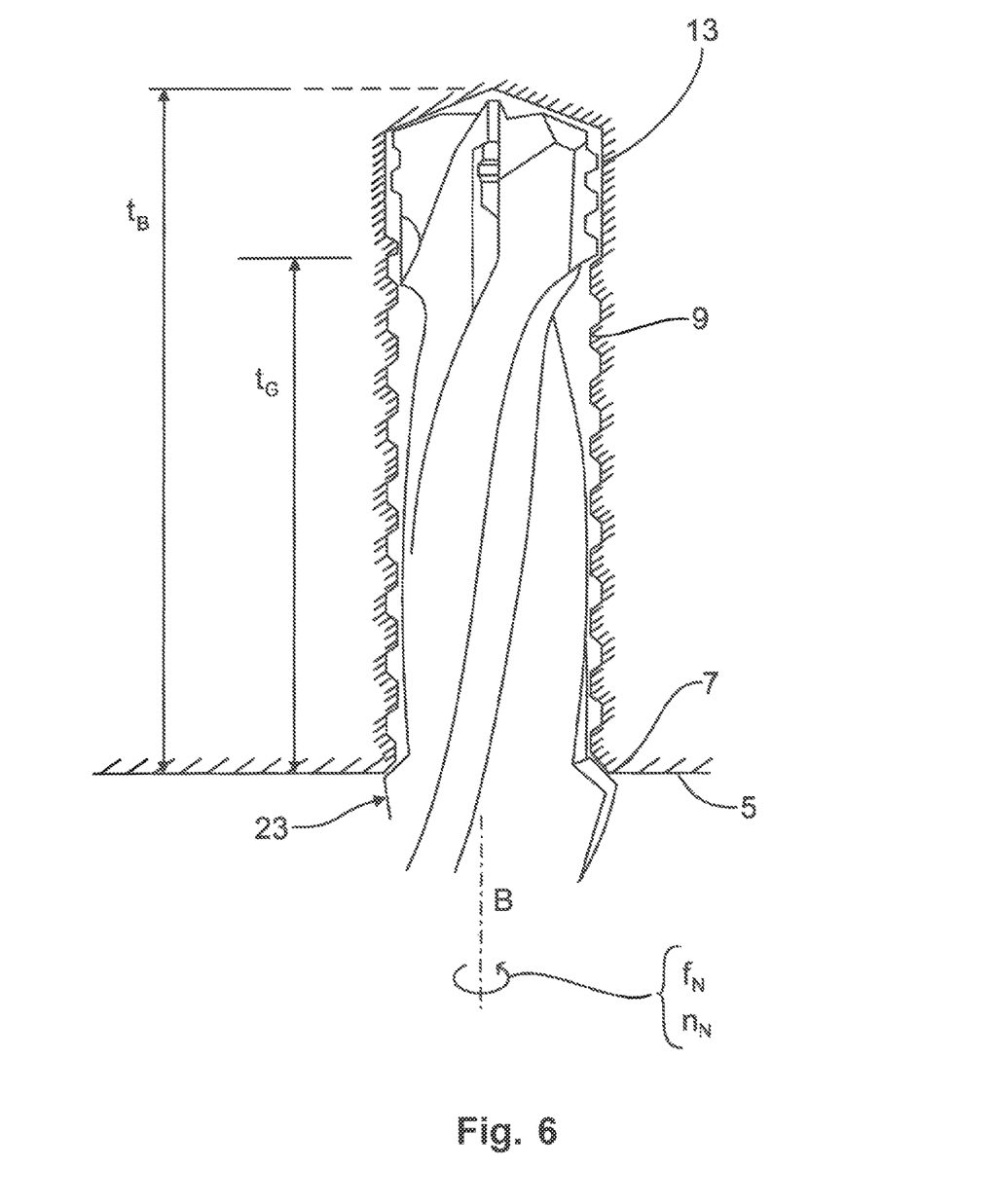
FIG. 6 illustrates another view that illustrate the method steps for producing the threaded blind hole shown in FIG. 1.
Figure 7:
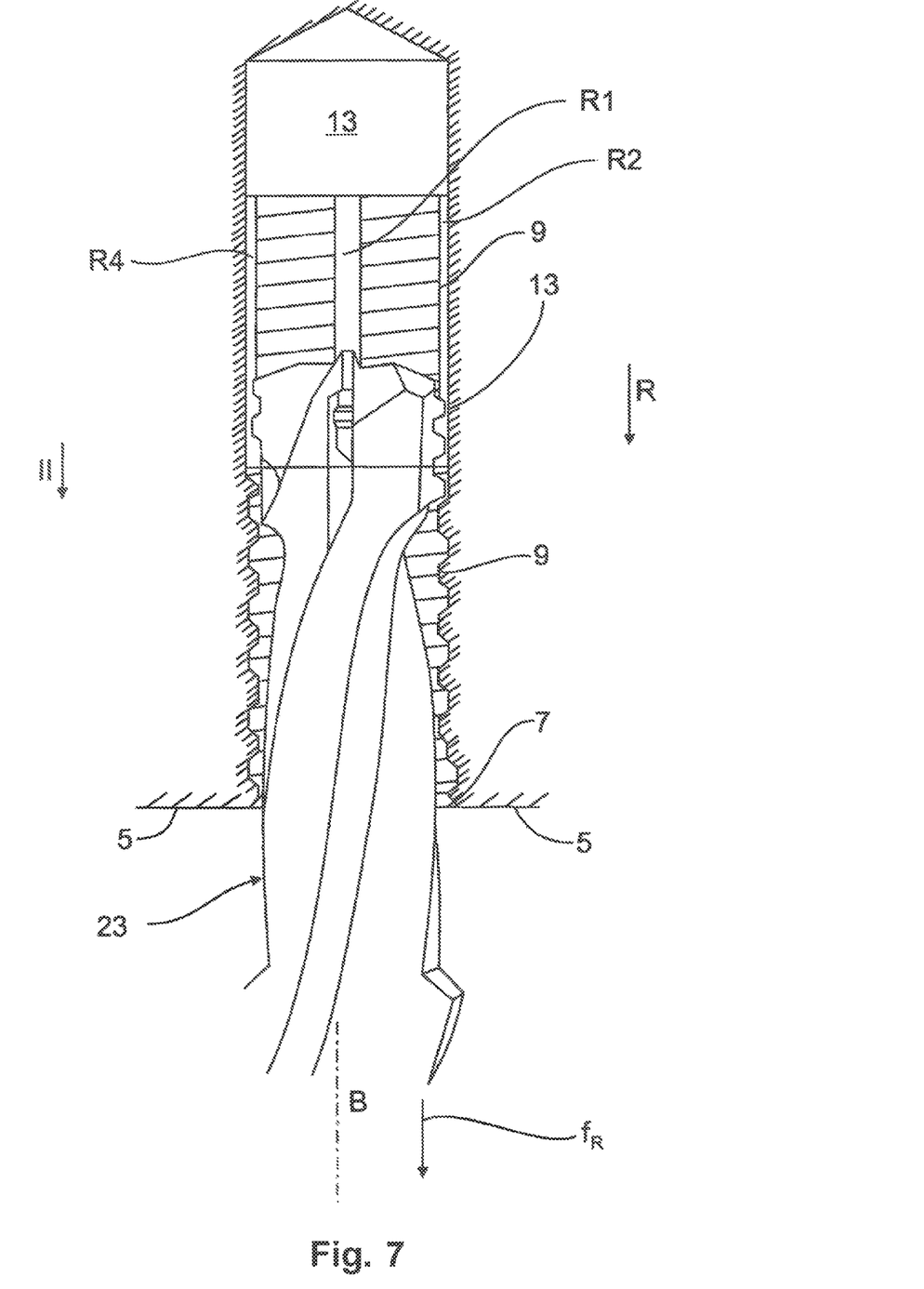
FIG. 7 illustrates another view that illustrate the method steps for producing the threaded blind hole shown in FIG. 1.

In this way, the thread profile 29 produces (in the groove-forming step), by use of its preliminary cutting, middle cutting, and finishing cutting teeth 41, 42, 43, 44 as well as by use of its broaching cutting edges 46, 48, 50, 52, the peripheral groove 13 shown in FIGS. 6 and 7, in which the thread profile 29 can rotate in a load-free manner. The groove-forming advance $f_N$ as well as the groove-forming rotational speed $n_N$ are indicated in such a way that an excessively large cutting load placed on the cutting teeth 41 to 44 as well as on the broaching cutting edges 46, 48, 50, 52 is prevented.

When the target hole depth $t_B$ is reached, both the groove-forming advance $f_N$ and the groove-forming rotational speed $n_N$ are reduced to 0. Subsequently, for preparation of a reversing stroke R (FIG. 7), a reversal of the advance occurs. In the reversing stroke R (FIG. 7), the thread tapping tool bit 23 is withdrawn out from the threaded hole 1 in a reversing direction II (FIG. 7) and, in fact, is carried out with an opposite reversing feed $f_R$ as well as at a rotational speed of 0. In this way, by means of the broaching cutting edges 46, 48, 50, 52, the broached grooves R1 to R4 are produced in the internal thread 9, by way of which the thread cutting teeth 41, 42, 43, 44 are withdrawn out from the threaded hole 1 in a load-free manner.

Figure 8:
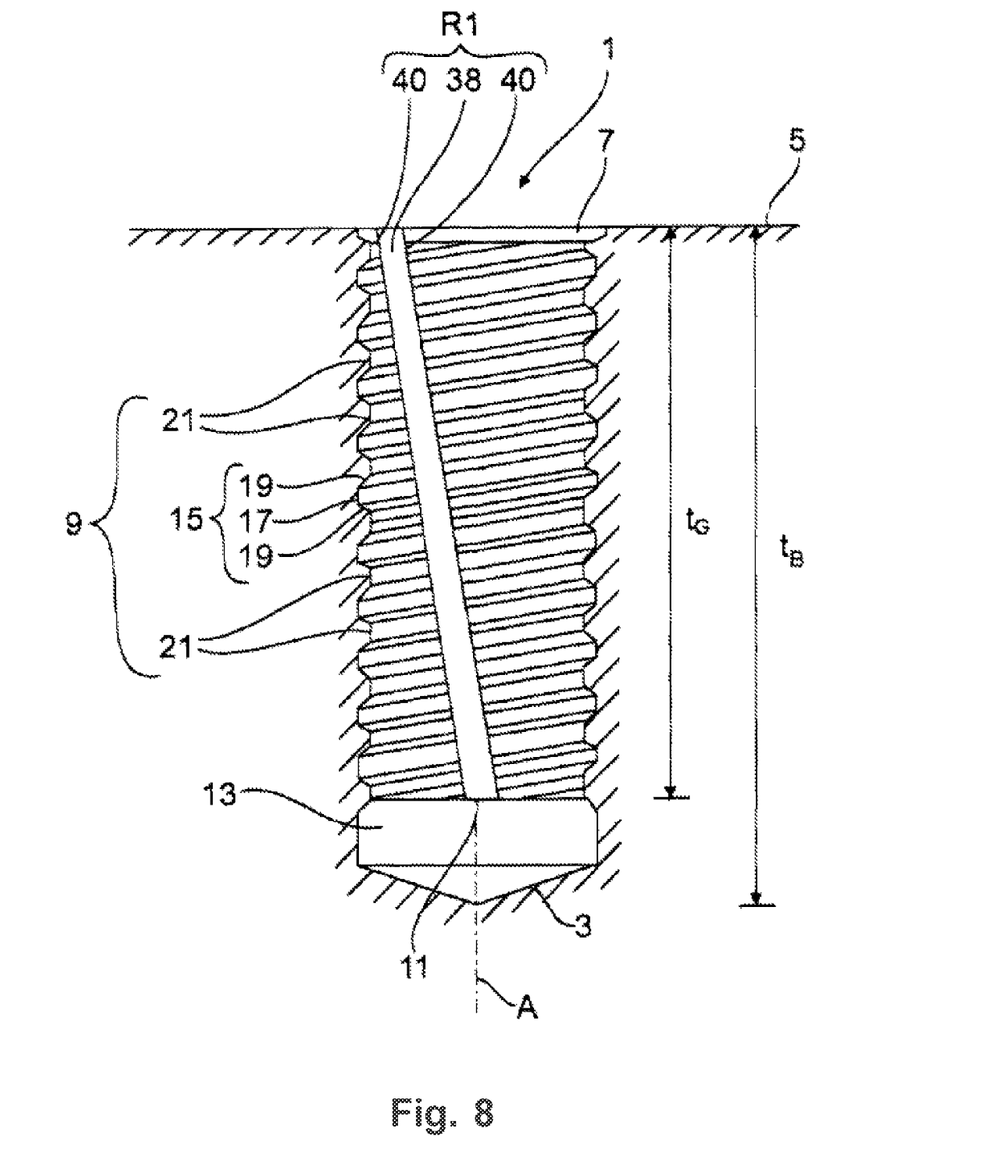
Figure 9:
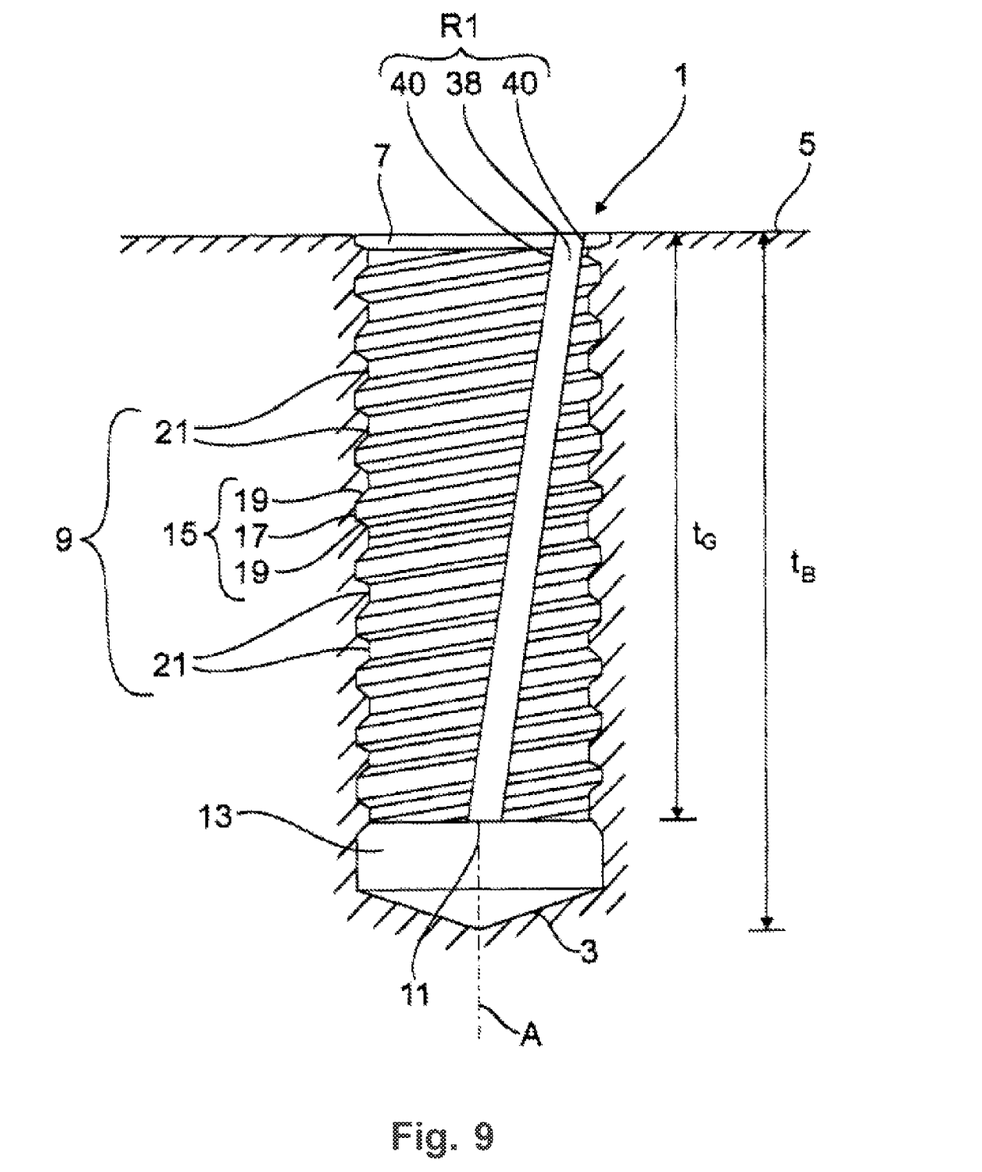

In the above-described process sequence, the reversing rotational speed $n_R$ of the thread tapping tool bit 23 is 0 during the reversing stroke H (FIG. 7), so that the broached grooves R1 to R4 extend in a straight line in the axial direction. Alternatively to this, the reversing stroke H can also occur helically, that is, at a reversing rotational speed $n_R$ greater than 0, as illustrated in FIGS. 8 and 9: In FIG. 8, the thread tapping rotational speed $n_G$ (in the thread tapping stroke G) is reduced to the lower reversing rotational speed $n_R$ (in the reversing stroke R) and, in fact, this is conducted without reversal of the direction of rotation.

In FIG. 9, in contrast, the thread tapping rotational speed $n_G$ is reduced to 0 and the reversing stroke R is initiated with a reversal of the direction of rotation. Therefore, the thread pitch of the helical broached groove R1 shown in FIG. 9 is formed oppositely directed to the thread pitch of the internal thread 9.

The invention claimed is:

1. A method for producing a threaded hole in a workpiece with a thread tapping tool bit, which has a main cutting edge at its drill bit tip and a thread profile that trails in a thread tapping direction with at least one thread cutting tooth, comprising:

in a thread tapping stroke, the main cutting edge produces a core hole, and, at the same time, the thread profile forms an internal thread at the inner wall of the core hole until a target thread depth is reached, and, is conducted with a thread tapping advance in the thread tapping direction and at a thread tapping rotational speed of the thread tapping tool bit synchronized with it, wherein, after the thread tapping stroke, an oppositely directed reversing stroke is produced, in which the thread tapping tool bit is withdrawn out from the threaded hole in a reversing direction, and, is conducted with an opposite reversing advance, wherein the thread profile has at least one broaching cutting edge, and when the reversing stroke is carried out, a broached groove is produced by the broaching cutting edge, through which the thread cutting tooth is withdrawn out from the threaded hole in a load-free manner, without removal of material, in that, between the thread tapping stroke and the reversing stroke, a groove-forming step is produced, in which the thread tapping stroke is prolonged in the thread tapping direction by a groove-forming stroke, and, this is conducted for forming a peripheral groove without thread pitch that adjoins the internal thread, in which the thread profile can rotate without advance in a load-free manner, and, in the groove-forming step, the thread tapping drill bit is moved in the thread tapping direction beyond the target thread depth until it reaches a target hole depth, and, is moved with a groove-forming advance and at a groove-forming rotational speed that are not synchronized with each other, and/or are different from the thread tapping advance and from the thread tapping rotational speed.

2. The method according to claim 1, wherein, when the reversing stroke is carried out, the rotational speed of the thread tapping tool bit is 0.

3. The method according to claim 1, wherein, when the reversing stroke is carried out, the rotational speed of the thread tapping tool bit is greater than 0, so that the broached groove is executed helically, and wherein when the reversing stroke is carried out, a reversal in the direction of rotation occurs, so that the thread pitch of the helical broached groove is oppositely directed to the thread pitch of the internal thread.

4. The method according to claim 1, wherein the broached groove crosses the thread turn of the internal thread, and/or the broached groove bottom of the broached groove cutting edge lies radially outside of a radially outer thread root of the internal thread.

5. The method according to claim 1, wherein the thread tapping tool bit has a plurality of peripherally distributed thread cutting teeth, and each of the thread cutting teeth is associated with at least one broaching cutting edge.

6. The method according to claim 5, wherein the broaching cutting edge is dimensioned so that, in the thread tapping stroke, it can be guided in a load-free manner through the thread turn formed by means of the thread cutting tooth.

7. The method according to claim 1, wherein, in the groove-forming step, the thread profile of the thread tapping tool bit rotates completely in the peripheral groove of the threaded hole.

8. The method according to claim 1, wherein, during the groove-forming stroke, the peripheral groove is produced by means of the main cutting edge and the thread cutting teeth of the thread profile (29), and/or by the broaching cutting edge.

9. The method according to claim 1, wherein the thread tapping tool bit is formed with a cutting edge with which a peripheral thread countersink is produced in the opening of the hole, and the peripheral thread countersink is produced during the groove-forming step.

10. The method according to claim 1, wherein, when the target hole depth is reached, the groove-forming advance is reduced to 0 and the groove-forming rotational speed is reduced to 0 for the preparation of the reversing stroke.

11. The method according to claim 1, wherein, at the start of the reversing stroke, the thread tapping tool bit is actuated so that the thread cutting tooth is driven in a load-free manner, without removal of material, into a broached groove outlet, which opens into the peripheral groove.

12. The method according to claim 1, wherein, during the thread tapping stroke, the groove-forming stroke, and the reversing stroke, the rotational axis of the thread tapping tool bit and the longitudinal axis of the hole are aligned coaxially to each other.

13. The method according to claim 1, wherein the thread tapping tool bit is utilized as a pre-processing tool bit, and the pre-processed threaded hole is post-processed in a post-processing step with the aid of a finishing tool bit, wherein a thread former, a helical thread former, or an axial thread former can be utilized as a finishing tool bit.

14. The method according to claim 1, wherein the thread tapping tool bit itself is utilized as a finishing tool bit.

* * * * *